United States Patent [19]
Yokomizo

[11] Patent Number: 4,517,605
[45] Date of Patent: May 14, 1985

[54] IMAGE SIGNAL PROCESSING APPARATUS
[75] Inventor: Yoshikazu Yokomizo, Kawagoe, Japan
[73] Assignee: Canon Kabushiki Kaisha, Tokyo, Japan
[21] Appl. No.: 349,168
[22] Filed: Feb. 16, 1982
[30] Foreign Application Priority Data Feb. 27, 1981 [JP] Japan .................................. 56-27760

[51] Int. Cl.³ .............................................. H04N 1/40
[52] U.S. Cl. .................................. 358/280; 358/283; 358/298
[58] Field of Search ............... 358/280, 283, 138, 260, 358/298

[56] References Cited
U.S. PATENT DOCUMENTS 3,739,082 6/1973 Lippel ................................ 358/138
4,194,221 3/1980 Stoffel ................................ 358/283
4,245,258 1/1981 Holladay ........................... 358/283
4,288,821 9/1981 Lavallee et al. .................... 358/280
4,340,912 7/1982 Troxel ................................ 358/283
4,345,276 8/1982 Colomb ............................. 358/287
4,349,846 9/1982 Sekigawa ........................... 358/283

FOREIGN PATENT DOCUMENTS 1547483 6/1979 United Kingdom ............... 358/280

Primary Examiner—John C. Martin
Assistant Examiner—Edward L. Coles
Attorney, Agent, or Firm—Fitzpatrick, Cella, Harper & Scinto

[57] ABSTRACT

An image signal processing apparatus provides both improved tonal rendition and resolving power by utilizing a dither matrix in which dither data indicating threshold values are formed by a dither matrix divided into plural sub-dither matrices for providing dither data arranged in a low spatial frequency and such dither data are compared with the density signals from an image.

18 Claims, 10 Drawing Figures

FIG. 5

| 61 | 17 | 33 | 49 |
|----|----|----|----|
| 45 | 1  | 5  | 21 |
| 29 | 13 | 9  | 37 |
| 57 | 41 | 25 | 53 |

FIG. 6

| 62 | 18 | 34 | 50 |
|----|----|----|----|
| 46 | 2  | 6  | 22 |
| 30 | 14 | 10 | 38 |
| 58 | 42 | 26 | 54 |

FIG. 7

| 63 | 19 | 35 | 51 |
|----|----|----|----|
| 47 | 3  | 7  | 23 |
| 31 | 15 | 11 | 39 |
| 59 | 43 | 27 | 55 |

FIG. 8

| 64 | 20 | 36 | 52 |
|----|----|----|----|
| 47 | 4  | 8  | 24 |
| 32 | 16 | 12 | 40 |
| 60 | 44 | 28 | 56 |

FIG. 9

| 61 | 17 | 33 | 49 |
|----|----|----|----|
| 45 | 1  | 5  | 21 |
| 29 | 13 | 9  | 37 |
| 57 | 41 | 25 | 53 |

| 63 | 19 | 35 | 51 |
|----|----|----|----|
| 47 | 3  | 7  | 23 |
| 31 | 15 | 11 | 39 |
| 59 | 43 | 27 | 55 |

| 64 | 20 | 36 | 52 |
|----|----|----|----|
| 48 | 4  | 8  | 24 |
| 32 | 16 | 12 | 40 |
| 60 | 44 | 28 | 56 |

| 62 | 18 | 34 | 50 |
|----|----|----|----|
| 46 | 2  | 6  | 22 |
| 30 | 14 | 10 | 38 |
| 58 | 42 | 26 | 54 |

FIG. 10

| 61 | 17 | 33 | 49 | 63 | 19 | 35 | 51 |
|----|----|----|----|----|----|----|----|
| 45 | 1  | 5  | 21 | 47 | 3  | 7  | 23 |
| 29 | 13 | 9  | 37 | 31 | 15 | 11 | 39 |
| 57 | 41 | 25 | 53 | 59 | 43 | 27 | 55 |
| 64 | 20 | 36 | 52 | 62 | 18 | 34 | 50 |
| 48 | 4  | 8  | 24 | 46 | 2  | 6  | 22 |
| 32 | 16 | 12 | 40 | 30 | 14 | 10 | 38 |
| 60 | 44 | 28 | 56 | 58 | 42 | 26 | 54 |

# IMAGE SIGNAL PROCESSING APPARATUS

BACKGROUND OF THE INVENTION

1. Field of the Invention

The present invention relates to an image signal processing apparatus for reading an original image and processing the thus obtained electric signals for use in a facsimile apparatus or the like, and more particularly such image signal processing apparatus utilizing a dither method for processing continuous tone in said original image.

2. Description of the Prior Art

The so-called dither method is already known for reproducing tonal rendition in an image reproducing apparatus only capable of producing a binary image composed of image areas and nonimage area such as black and white. This method is based on comparing, in digitizing the density signals obtained from the original image with a comparator, said density signals with reference voltages successively varied for example in 16 steps instead of a fixed reference voltage to obtain 17 different black-to-white area ratios, thereby reproducing 17 different densities utilizing the integrating effect of human eyes. In said method the 16 different reference voltages are so applied as to minimize the length of the external perimeter of pixels corresponding to said reference voltages in order to facilitate the integrating effect of human eyes. For example, if each pixel is square-shaped, said pixels are arranged as a square or a matrix of 4×4 pixels, which is called a dither matrix representing 16 comparison levels. Said 16 levels are assigned in an appropriate order to 4×4 pixels constituting said dither matrix to provide 17 combinations of black and white areas corresponding to 17 different densities.

Said assignment of 16 levels to the 4×4 pixels can be made in various manners, mathematically as many as:

$$_{16}P_{16} = 16! \simeq 2 \times 10^{13} \quad (1)$$

but one of the theoretically best arrangements of said levels would be the method proposed by Judis to maximize the spatial frequency of said arrangement. In this method an n×n dither matrix $D^n$ where n is a power of 2 is given by:

$$D^n = \left( \begin{array}{c|c} 4D^{n/2} & 4D^{n/2} + 2U^{n/2} \\ \hline 4D^{n/2} + 3U^{n/2} & 4D^{n/2} + U^{n/2} \end{array} \right) \quad (2)$$

and $$D^2 = \begin{pmatrix} 0 & 2 \\ 3 & 1 \end{pmatrix} \quad (3)$$

where $U^n$ is an n×n matrix of which the elements are all 1.

This method is based on the integrating effect of human eyes and provides a good resolving power even when the original image shows change in density with a relatively high spatial frequency, but the tonal rendition becomes deteriorated if the printer is unable to accurately reproduce each pixel.

More specifically, in case the resolving power of the printer represented by the modulation transfer function does not reach 1.0 at a spatial frequency equal to twice the Nyquist frequency $f_N$, the reflective density of the obtained print becomes aberrated from the theoretical value represented by:

$$D = -\ln \frac{1}{Pe^{-B} + (1 - P)e^{-W}} \quad (4)$$

wherein D is the reflective density, B black-level reflective density, W white-level reflective density and P probability of presence of black pixels.

In such case the printer is unable to accurately print each pixel, and the reproduced image shows deteriorated tonal rendition with obscure boundaries between black areas and white areas, in comparison with the original image.

In case the printer is incapable of reproducing minimum dots, the tonal rendition can be made optimum, quite contrary to Judis' method, by an order of arrangement of the aforementioned levels so as to minimize the spatial frequency in the dither matrix. In this method the tonal rendition is improved since the image components of higher spatial frequencies are reduced in the reproduced image and the image reproduction is conducted principally in a part of printer performance where the resolving power (modulation transfer function) is high. In such case, however, the resolving power of the reproduced image is deteriorated due to the reduced spatial frequency of the dither matrix.

As explained above, the improvement in the tonal rendition and that in the resolving power are mutually contradictory requirements in the case that the printer is unable to satisfactorily reproduce the minimum dots, and a level arrangement in the dither matrix simultaneously satisfying these requirements has not been found.

SUMMARY OF THE INVENTION

The object of the present invention is to provide an image signal processing apparatus capable of showing improved tonal rendition and resolving power by means of a dither matrix.

Another object of the present invention is to provide an image signal processing apparatus capable of more accurately reproducing the continuous tone in the original image by means of the dither method.

Still another object of the present invention is to provide an image signal processing apparatus capable of producing an excellent reproduced image by a simple structure.

Still other objects and advantages of the present invention will be made fully apparent from the following description of the preferred embodiments to be taken in conjunction with the attached drawings.

BRIEF DESCRIPTION OF THE DRAWINGS

FIGS. 5, 6, 7 and 8 are examples of level arrangement in the sub-dither matrix;

FIG. 9 is a view showing the sub-dither matrices of FIGS. 5 to 8 arranged as shown in FIG. 4; and FIG. 10 is a view showing an 8×8 dither matrix composed of the sub-dither matrices shown in FIGS. 5 to 8.

DETAILED DESCRIPTION OF THE PREFERRED EMBODIMENTS

Figure 1:
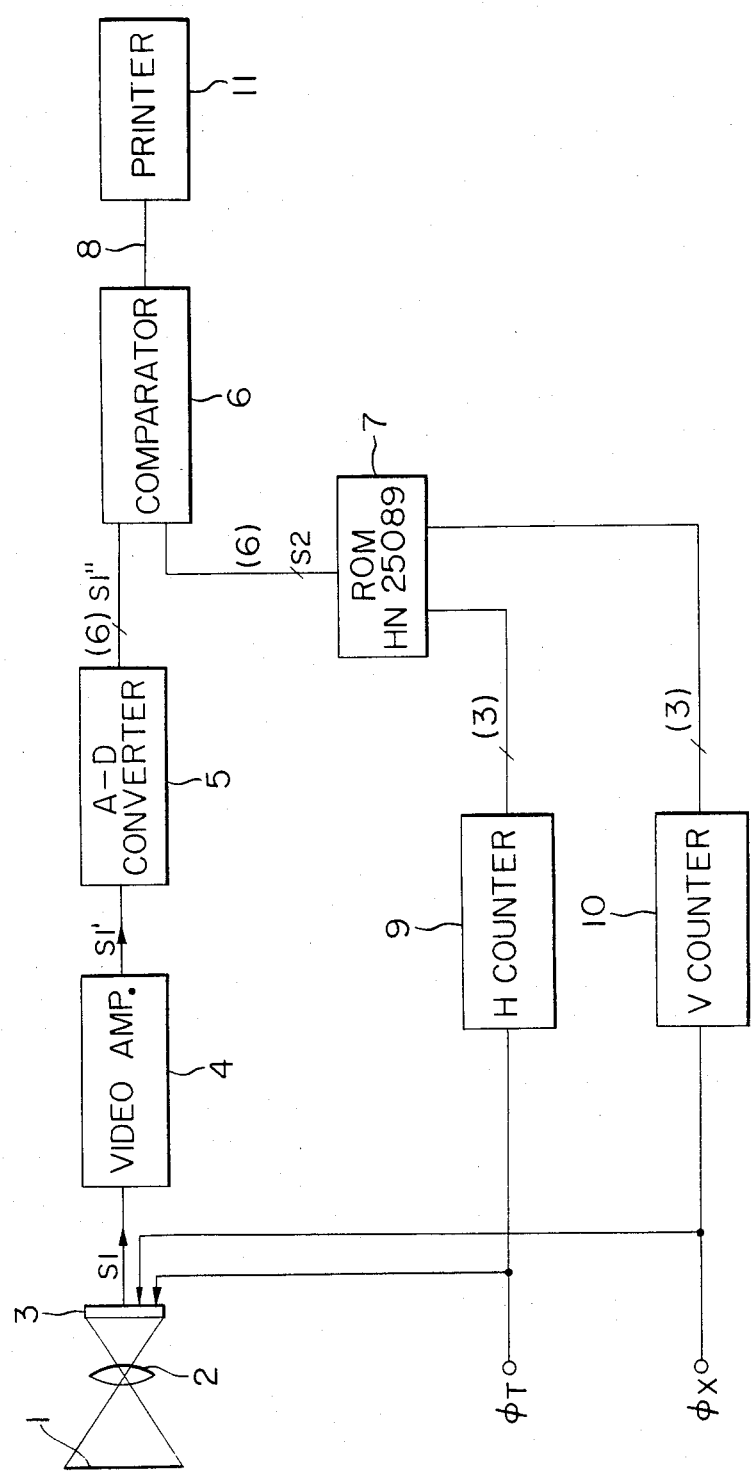
FIG. 1 is a block diagram of an image signal processing apparatus embodying the present invention.

Referring to FIG. 1 showing an image signal processing apparatus of the present invention in a block diagram, an original image 1 illuminated by an unrepresented light source is imaged through a lens 2 onto a solid-state image sensor 3. Said sensor 3, composed of a linear sensor, performs the principal scanning to generate sequential video signals, while the auxiliary scanning of the original image is conducted either by the displacement of the original image 1 or of the solid-state image sensor 3, according to the already known technology which is not explained in detail.

Said solid-state image sensor 3 resets all the photodiodes therein in response to a horizontal synchronizing signal $\phi_X$, and thereafter sequentially transfers the video signals $S_1$ in response to transfer clock pulses $\phi_T$. A video amplifier 4 amplifies said video signals $S_1$ to video signals $S_{1'}$ of a desired level, which are digitized for example into 64 levels by an A-D converter 5 having six output lines corresponding to said 64 levels. In FIG. 1, the parenthesized numeral shown on a line indicates the number of circuits. The digitized signals $S_{1''}$ are supplied to a comparator 6.

The comparator 6 compares said digitized signals with dither data $S_2$ indicating threshold levels supplied in succession from a read-only memory 7 and emits a high-level signal from an output terminal 8 when said digitized signal is larger. Said read-only memory 7 can be composed of HN25089, but the present invention is not limited to such use.

A printer 11 prints black or white respectively in response to the high-level or low-level signal from said output terminal 8, but is unable to print an intermediate tone. Said printer 11 can be a thermal printer utilizing a full-line thermal head, or an ink jet printer in which an ink jet nozzle unit positioned in front of a rotating drum bearing a recording sheet is displaced parallel to the rotary axis of said drum, or any other known printer. The technology for these printers is already known in the art and will not, therefore, be explained further in the present description.

The read-only memory 7 successively generates dither data for 64 pixels by periodically switching 6 address lines, of which three are connected to an octanary horizontal (H) counter 9 for counting the transfer pulses $\phi_T$ to obtain a same signal from the read-only memory 7 for every 8 pixels, while the remaining three lines are connected to an octanary vertical (V) counter 10 for counting the horizontal synchronizing signals $\phi_X$ to obtain the same signal from the read-only memory 7 for every eight scanning line. In this manner the combination of the H-counter and V-counter provides a dither pattern composed of a checkerboard arrangement of 8×8 dither matrices.

Also in the present invention the above-mentioned read-only memory 7 may be replaced by a diode matrix, a switch group or any other suitable means capable of generating the required dither data.

Figure 2:
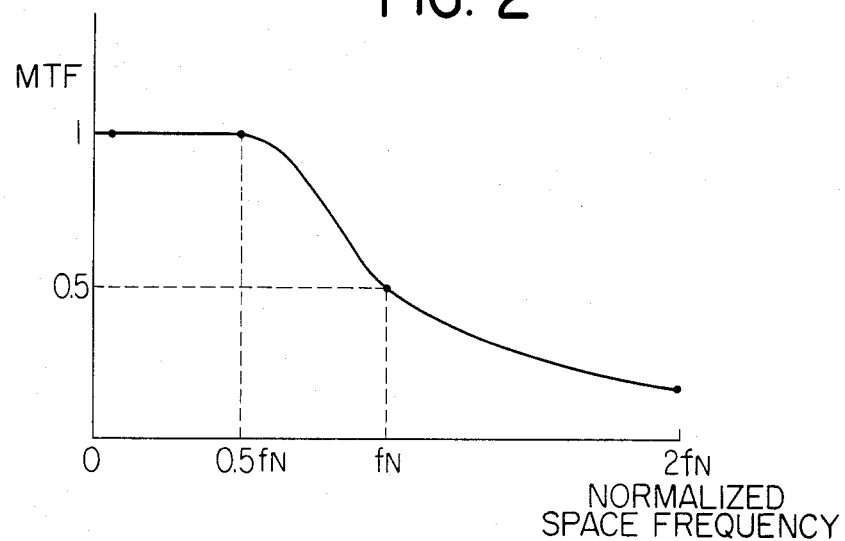
FIG. 2 is a chart showing an example of the resolving power, represented by the modulation transfer function, of the printer.
Figure 3:
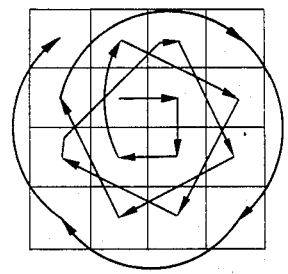
FIG. 3 is a chart showing an example of the level arrangement in the dither matrix to obtain a low spatial frequency.

FIG. 2 shows the resolving power of the printer 11 represented by the modulation transfer function in the ordinate as a function of the spatial frequency normalized from the image spatial frequency corresponding to the frequency of the input image signals, wherein $f_N$, the so-called Nyquist frequency, indicates the maximum frequency of the input image signals reproducible from the data sampled at a given frequency from said input image signals. It will be understood from the figure that the resolving power is sufficiently high at $0.5f_N$ but is reduced to 0.5 at said frequency $f_N$, and becomes quite low at $2f_N$. The spatial frequency of $0.5f_N$ corresponds to a pitch of 4 pixels in the horizontal or vertical direction, or to a pitch of a matrix of 4×4 pixels. Also the spatial frequency $f_N$ corresponds to a pitch of 2 pixels in the horizontal or vertical direction, or to a pitch of a matrix of 2×2 pixels, at which the resolving power is lowered to 0.5 as explained above. Furthermore the spatial frequency $2f_N$ corresponds to a pitch of 1 pixel, at which the resolving power is almost nil as explained above. Stated differently, the dither method based on a minimum unit of 4×4 pixels is capable of providing tonal rendition meeting the theory regardless of the type of dither matrix employed, but, in an area smaller than 4×4 pixels the neighboring pixels are fused together to indicate an averaged density, showing an almost analog tonal rendition. In case of printing utilizing electrostatic image development, the tonal rendition in an area smaller than 4×4 pixels becomes deteriorated since the linearity of the tonal rendition is worse than the theoretical value shown in the equation (4). Such defect can be avoided by the use of a dither matrix in which the dither levels are so arranged as to constitute a low spatial frequency, for example as shown in FIG. 3, in which the threshold levels are lower in the central portion of the dither matrix and are made spirally higher toward the outside. When an image of uniform density is read with such a dither pattern, the reproduced image becomes darker in the center of each sub-dither matrix of 4×4 pixels, where the threshold levels are lower. Consequently, in case the dither pattern is composed of plural sub-dither matrices of 4×4 pixels, an intermediate tone is reproduced by the repetition of an image of 4×4 pixels in which the density is progressively higher toward the center. Such repeated pattern of dark dots has a repeating pitch of 4 pixels corresponding to a normalized spatial frequency of $0.5f_N$, so that the tonal rendition is not deteriorated.

Figure 4:
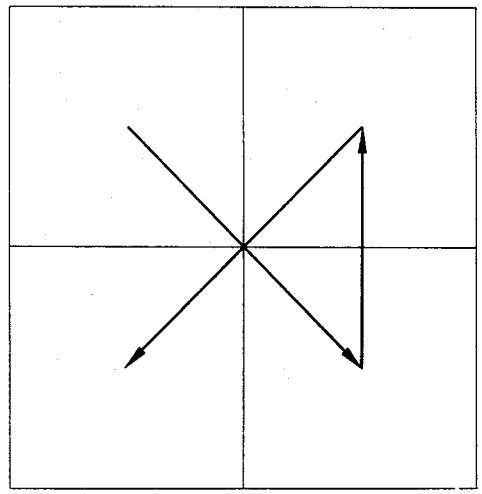
FIG. 4 is a chart showing an example of the dither matrix in which four sub-dither matrices of 4×4 pixels are arranged to obtain a high spatial frequency.

The aforementioned consideration is no longer necessary in an area larger than 4×4 pixels, since the tonal rendition faithfully follows the equation (4) regardless of the type of the dither matrix. Consequently the threshold levels in the dither matrix for such area should preferably be so arranged so to provide a high spatial frequency, in order to facilitate the integrating effect of human eyes. As an example, if the minimum sub-dither matrix is composed of 4×4 pixels, a next larger dither matrix constituted by such sub-dither matrices is of 8×8 pixels containing four sub-dither matrices. In such a dither matrix a higher spatial frequency can be attained by arranging the average value of 16 threshold levels constituting each sub-dither matrix of 4×4 pixels in the order of arrows shown in FIG. 4. In this manner the mutually contradicting requirements for the improvements of the tonal rendition and of the resolving power can be simultaneously satisfied by arranging said sub-dither matrices of 4×4 pixels as shown in FIG. 4 and by arranging the threshold levels in each sub-dither matrix of 4×4 pixels as shown in FIG. 3. It is to be further noted that the order of arrangement of four sub-dither matrices is not necessarily limited to that shown in FIG. 4.

FIGS. 5 to 8 illustrate examples of threshold level arrangement in the sub-dither matrix of 4×4 pixels, wherein the levels are represented by decimal numbers. FIG. 5 shows a level arrangement in said sub-dither matrix, in the order shown in FIG. 3 by a pitch of every 4 levels starting from the 1st level. Also FIGS. 6, 7 and 8 illustrate level arrangements in said order respectively starting from the 2nd, 3rd and 4th level. Consequently the average of the threshold levels in the sub-dither matrix shown in FIGS. 5, 6, 7 and 8 becomes higher in this order. FIG. 9 shows these four sub-dither matrices arranged in the order shown in FIG. 4. Thus, said four sub-dither matrices can be combined to form an 8×8 dither matrix as shown in FIG. 10, which is essentially capable of reproducing 64 levels, since each of the 64 threshold levels appear only once. In comparison with other 64-level dither matrices, the dither matrix shown in FIG. 10 is characterized in that the spectral distribution of the spatial frequencies of threshold levels in said dither matrix is concentrated at $\frac{1}{2}$ of the Nyquist frequency $f_N$ and is significantly less at other frequencies, thus providing a pattern pitch of 4 pixels.

Consequently, in comparison with a dither matrix of 8×8 pixels with a low spatial frequency level arrangement, the dither matrix of the present invention is capable of effecting the dither method of 64 levels with an improved resolving power despite the fact that the repeating pitch of the dither pattern is as small as 4×4 pixels, thus simultaneously satisfying the mutually contradicting requirements for the improvement of tonal rendition and resolving power.

The order of arrangement of the threshold levels in the sub-dither matrix is not limited to that shown in FIG. 3. As an example, another arrangement in which the threshold level is highest at the center and is progressively lowered toward the periphery will provide a low spatial frequency, with the aforementioned results.

In the present invention, the matrix size is not limited to the foregoing embodiment, and the number of levels is not limited to 64. Also the matrix size or the number of pixels need not coincide with the number of levels. For example, a dither matrix as shown in FIG. 9 can be composed of two sub-dither matrices as shown in FIG. 6 and two sub-dither matrices as shown in FIG. 7, resulting in 32 levels. Furthermore the clockwise spiral order of arrangement shown in FIG. 3 may be replaced by any other order in which the successively assigned pixels expand while maintaining mutual contact. Furthermore each pixel or dither matrix need not necessarily be square-shaped. Furthermore the comparison of the video signal with the threshold level, conducted in digital form in the block diagram shown in FIG. 1, may also be conducted in analog form. Furthermore, in contrast to the dither matrix of FIG. 10 containing each of 64 levels only once, it is possible to omit certain levels and to use certain levels twice, thus modulating the level distribution to alter the image contrast. Also the dither matrix shown in FIG. 10 can be so modified as not to contain the 1st, 64th and other nearby levels since such levels often cause defects in the reproduction when the original image is a binary image containing solely black and white.

It will be readily understood that the present invention is by no means confined to the foregoing embodiments but is subject to various modifications within the scope and spirit of the appended claims.

What I claim is:
1. An image signal processing apparatus comprising:
   output means for generating density signals of an image; and
   binary signal generating means for providing binary signals of said density signals, said binary signal generating means including dither converter means for performing dither conversion of said density signals by using at least a main dither matrix, said main dither matrix being divided into plural sub-dither matrices wherein parameters of said sub-dither matrices are set in such a manner that a spatial frequency of the dither pattern is low.
2. An image signal processing apparatus according to claim 1, wherein said plural sub-dither matrices are arranged in said main dither matrix in such a manner that the averages of dither levels in said sub-dither matrices represent a high spatial frequency.
3. An image signal processing apparatus according to claim 1 or 2, wherein each of said plural sub-dither matrices is so constructed as to minimize the length of external perimeter thereof.
4. An image signal processing apparatus according to claim 1, wherein said dither converter means is adapted to release dither data in sequence.
5. An image signal processing apparatus according to claim 4, wherein said output means is adapted to release said density signal in sequence.
6. An image signal processing apparatus according to claim 5, wherein said binary signal generating means includes comparator means adapted to compare said sequential density signals with said sequential dither data and to generate binary signals in response to the result of said comparison.
7. An image signal processing apparatus according to claim 6, further comprising recording means for recording said binary signals from said comparator means on a recording member.
8. An image signal processing apparatus comprising:
   output means for generating density signals of an image; and
   binary signal generating means for providing binary signals of said density signals, said binary signal generating means including dither converter means for performing dither conversion of said density signals by using a dither matrix composed of plural sub-dither matrices each of which is composed of plural threshold values so arranged as to constitute a pattern of mutually contacted threshold values progressively expanding in the order of rising levels.
9. An image signal processing apparatus according to claim 8, wherein said plural sub-dither matrices are so arranged in said dither matrix that the averages of dither levels of said sub-dither matrices represent a high spatial frequency.
10. An image signal processing apparatus according to claim 8, wherein each of said sub-dither matrices is so constructed as to minimize the external perimeter thereof.
11. An image signal processing apparatus according to claim 10, wherein said plural threshold values are spirally arranged in each sub-dither matrix in the order of rising levels.
12. An image signal processing apparatus according to claim 8, wherein said dither converter means is adapted to sequentially providing dither data of said dither matrix.

13. An image signal processing apparatus according to claim 12, wherein said output means is adapted to sequentially provide density signals.

14. An image signal processing apparatus according to claim 13, wherein said binary signal generating means comprises comparator means for comparing said sequential dither data with said sequentially provided density signals.

15. An image signal processing apparatus comprising:
output means for generating density signals indicating densities of an original image; and
binary signal generating means for providing binary signals of said density signals, said binary signal generating means including dither converter means for performing dither conversion of said density signals by using at least a main dither matrix composed of plural sub-dither matrices which are so arranged that the averages of the dither levels of said sub-dither matrices represent a high spatial frequency.

16. An image signal processing apparatus according to claim 15, wherein said dither converter means is adapted to repeatedly use said dither matrix.

17. An image signal processing apparatus according to claim 15, wherein said main sub-dither matrix is composed of dither matrices of a number $n \times n$.

18. An image signal processing apparatus according to claim 17, wherein said sub-dither matrices have mutually different averages of dither levels.

* * * * *

UNITED STATES PATENT AND TRADEMARK OFFICE
CERTIFICATE OF CORRECTION

PATENT NO. : 4,517,605

DATED : May 14, 1985

INVENTOR(S) : YOSHIKAZU YOKOMIZO

It is certified that error appears in the above-identified patent and that said Letters Patent is hereby corrected as shown below:

Column 1: line 18, change "area" to --areas--.

Column 3: line 58, change "eight" to --eighth--.

Column 6: line 67, change "providing" to --provide--.

Column 8: line 10, change "sub-dither" to --dither--;

line 11, change "dither" to --sub-dither--.

Signed and Sealed this

Fourteenth Day of January 1986

[SEAL]

Attest:

Attesting Officer

DONALD J. QUIGG

Commissioner of Patents and Trademarks